United States Patent
Wittorf et al.

(10) Patent No.: US 9,440,699 B1
(45) Date of Patent: Sep. 13, 2016

(54) FOLDABLE SCOOTER/BIKE CONCEPT AND FOLDING MECHANISM

(71) Applicant: GM Global Technology Operations LLC, Detroit, MI (US)

(72) Inventors: Marten Wittorf, Ingelheim (DE); Stefan Herz, Kronberg (DE); David Schmid, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/744,618

(22) Filed: Jun. 19, 2015

(51) Int. Cl.
| | | |
|---|---|---|
| *B62K 15/00* | (2006.01) | |
| *B62K 3/00* | (2006.01) | |
| *B62K 11/02* | (2006.01) | |
| *B62K 21/16* | (2006.01) | |
| *B62M 7/00* | (2010.01) | |

(52) U.S. Cl.
CPC ............ *B62K 15/006* (2013.01); *B62K 3/002* (2013.01); *B62K 11/02* (2013.01); *B62K 21/16* (2013.01); *B62M 7/00* (2013.01)

(58) Field of Classification Search
CPC .... B62K 15/006; B62K 15/00; B62K 3/002; B62K 11/02; B62K 21/16; B62M 7/00
USPC ............. 280/278, 287, 87.05, 87.03, 87.021, 280/87.041
See application file for complete search history.

(56) References Cited

U.S. PATENT DOCUMENTS

| | | | | |
|---|---|---|---|---|
| 6,301,749 B1* | 10/2001 | Chen | ...................... | B62K 3/002 16/427 |
| 2001/0035621 A1* | 11/2001 | Herman | ............... | B62K 15/006 280/87.041 |
| 2015/0084312 A1* | 3/2015 | Schreuder | ............ | B62K 15/006 280/639 |
| 2015/0158543 A1* | 6/2015 | Neto | ...................... | B62K 15/00 180/208 |
| 2015/0266530 A1* | 9/2015 | O'Connell | ............... | B62H 1/12 280/224 |
| 2015/0266536 A1* | 9/2015 | Yap | ........................ | B62K 3/002 180/181 |
| 2015/0321722 A1* | 11/2015 | Dadoosh | ................ | B62K 3/002 180/208 |
| 2015/0375821 A1* | 12/2015 | Wu | ........................ | B62K 3/002 280/639 |
| 2016/0096576 A1* | 4/2016 | Gotfrid | ................ | B62K 15/006 280/641 |

* cited by examiner

*Primary Examiner* — Tony H. Winner
*Assistant Examiner* — Marlon A Arce
(74) *Attorney, Agent, or Firm* — BrooksGroup

(57) ABSTRACT

A number of variations may include a product comprising a scooter with an integrated folding system, wherein the scooter further comprises a first folding mechanism which allows a first and a second handle bar to fold within the steerer unit, a second folding mechanism which allows a steerer unit to be folded around a first wheel, and a third folding mechanism which allows a deck to be folded around the first wheel.

20 Claims, 6 Drawing Sheets

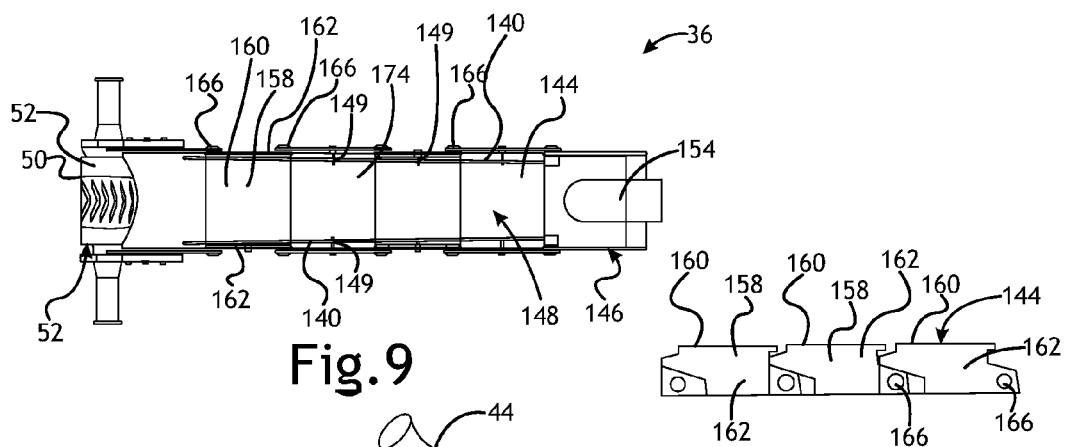
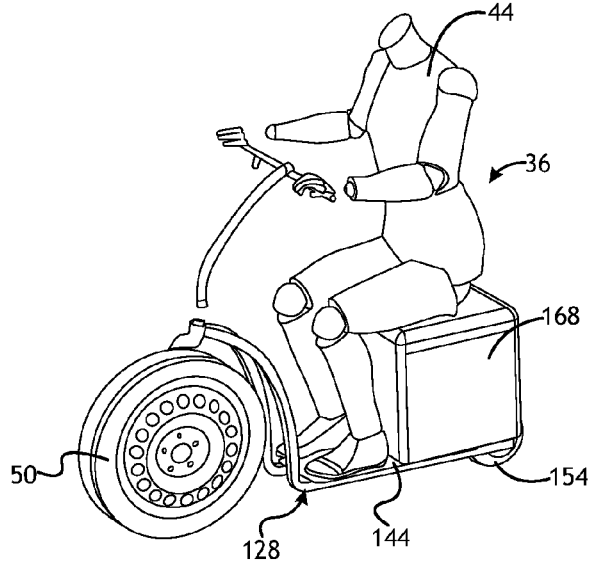
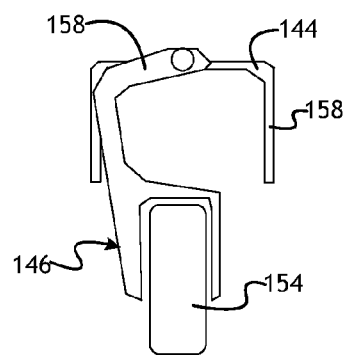
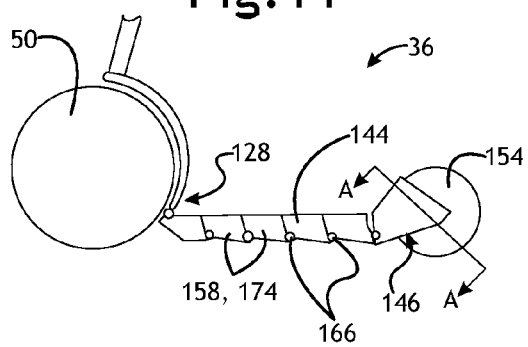

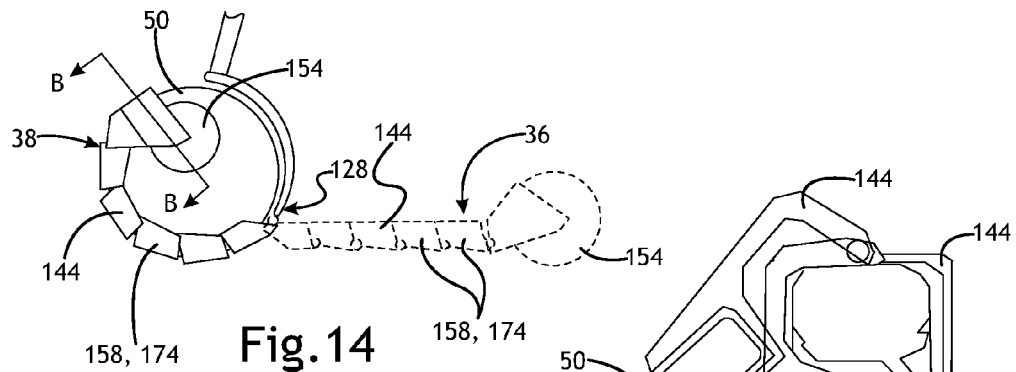
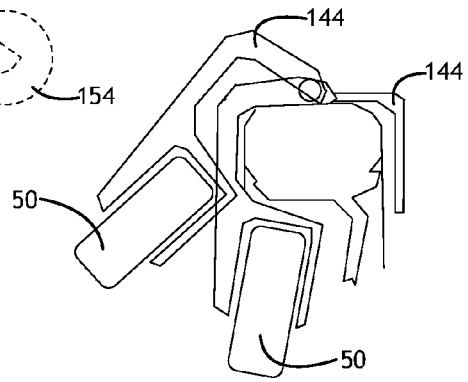
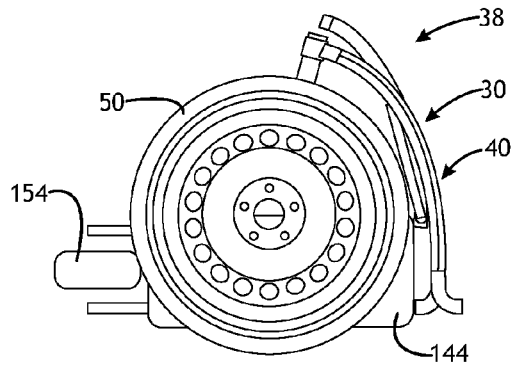
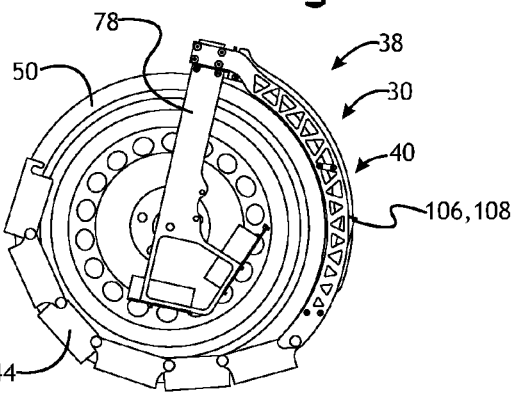
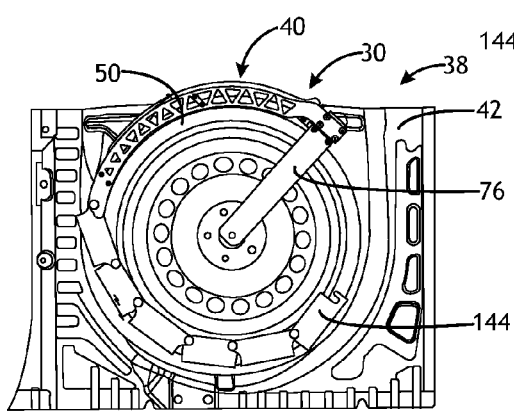

FOLDABLE SCOOTER/BIKE CONCEPT AND FOLDING MECHANISM

TECHNICAL FIELD

The field to which the disclosure generally relates to includes scooters.

BACKGROUND

In a number of variations, a scooter may be folded.

SUMMARY OF ILLUSTRATIVE VARIATIONS

A number of variations may include a product comprising a scooter with an integrated folding system, wherein the scooter further comprises a first folding mechanism which allows a first and a second handle bar to fold within a steerer unit, a second folding mechanism which allows the steerer unit to be folded around a first wheel, and a third folding mechanism which allows a deck to be folded around the first wheel.

A number of variations may include a scooter comprising: a first wheel; a first fork, wherein the first wheel is rotatably attached to the first fork; a neck, wherein the neck is rotatably attached to the first fork and contours a portion of the first wheel; a deck, wherein the deck is rotatably attached to the neck; a second wheel, wherein the second wheel is operatively connected to the deck; and a steerer unit, wherein the steerer unit further comprises a first handle bar and a second handle bar rotatably attached to the steerer unit, and wherein the steerer unit is operatively attached to the first wheel or the second wheel; wherein the steerer unit is constructed and arranged so that it can fold around the first wheel and the deck is constructed and arranged so that it can fold around the first wheel.

A number of variations may include a method comprising folding a scooter comprising: integrating a scooter with a first folding mechanism, a second folding mechanism, and a third folding mechanism; activating the first folding mechanism to fold a first and a second handle bar within a steerer unit; activating the second folding mechanism to fold the steerer unit around a portion of a first wheel; and activating the third folding mechanism to fold a deck around a portion of the first wheel.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 9 illustrates a bottom view of a foldable scooter deck according to a number of variations.

FIG. 10 illustrates a side view of a portion of a foldable scooter deck according to a number of variations.

FIG. 11 illustrates a perspective view of a foldable scooter with a seating unit according to a number of variations.

FIG. 12 illustrates a side section view of a foldable scooter according to a number of variations.

FIG. 13 illustrates a section view of FIG. 12 taken along line A-A.

FIG. 14 illustrates a side section view of a foldable scooter in a folded and unfolded position with sections removed according to a number of variations.

FIG. 15 illustrates a section view of FIG. 14 taken along line B-B.

FIG. 16 illustrates a top view of a foldable scooter in a folded position according to a number of variations.

FIG. 17 illustrates a bottom view of a foldable scooter in a folded position according to a number of variations.

FIG. 18 illustrates a foldable scooter in a folded position inside a vehicle according to a number of variations.

DETAILED DESCRIPTION OF ILLUSTRATIVE VARIATIONS

The following description of the variations is merely illustrative in nature and is in no way intended to limit the scope of the invention, its application, or uses.

Figures 1, 2:
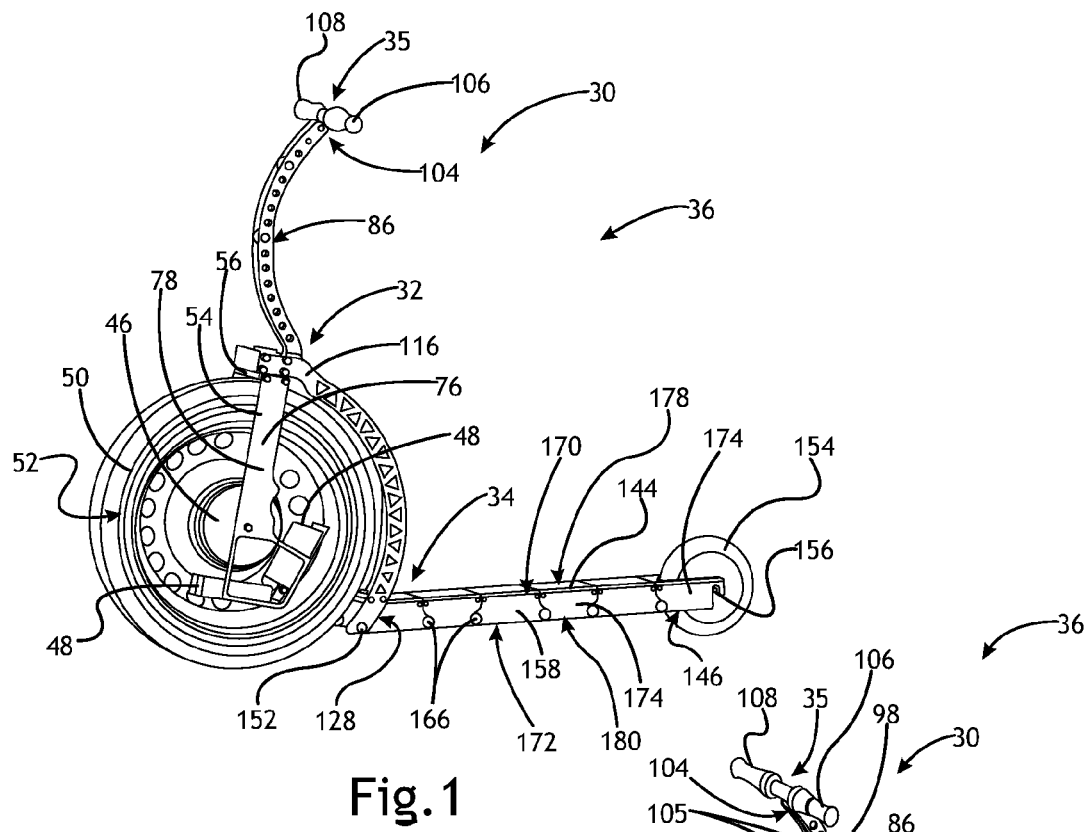
FIG. 1 illustrates a perspective view of a foldable scooter according to a number of variations.
FIG. 2 illustrates a perspective view of a foldable scooter according to a number of variations.
Figure 3:
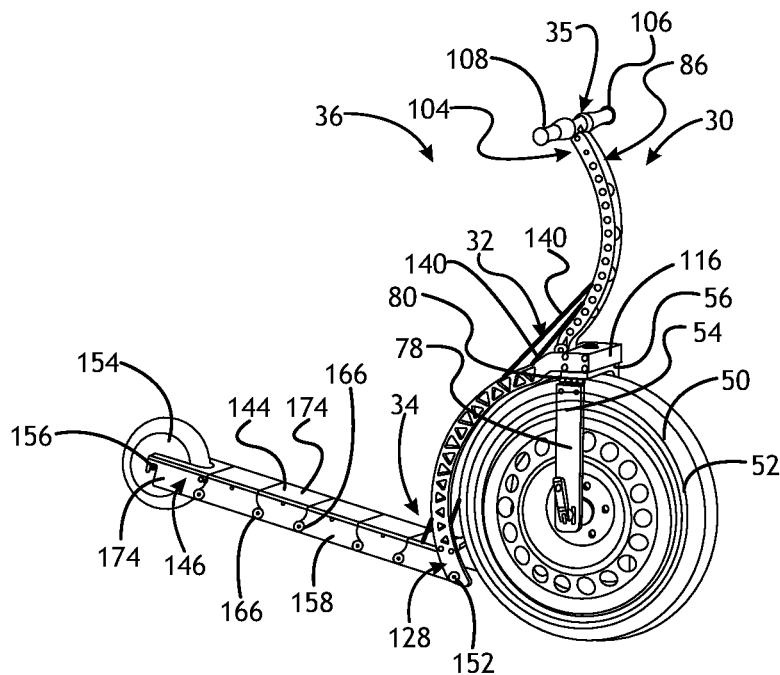
FIG. 3 illustrates a perspective view of a foldable scooter according to a number of variations.
Figure 4:
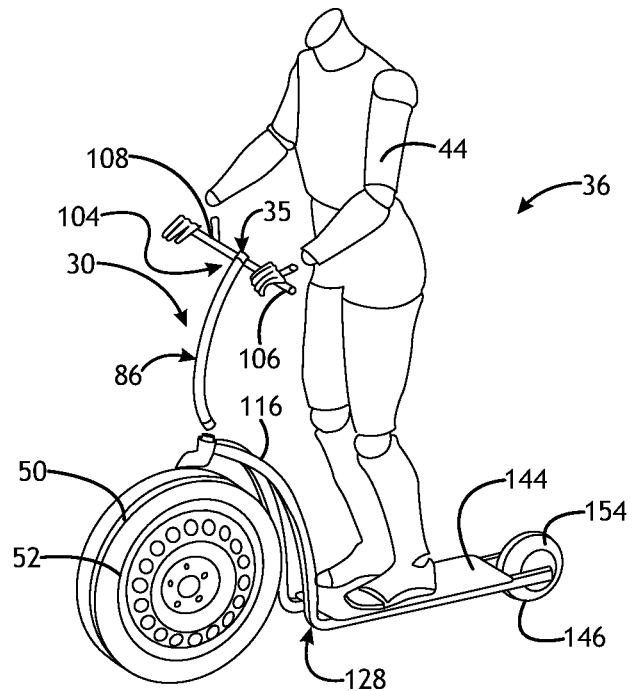
FIG. 4 illustrates a perspective view of a foldable scooter according to a number of variations.

FIGS. 1-4 and 17-18 illustrate a number of variations including a foldable scooter 30. In one variation, a foldable scooter 30 may include one or more folding mechanisms 32, 34, 35 variations of which are illustrated in FIGS. 1-3, which may allow the foldable scooter 30 to fold into a compact position 40, a variation of which is illustrated in FIG. 17. The scooter 30 in the compact position 40 may be constructed and arranged so that it may fit into a spare tire compartment 42, a variation of which is illustrated in FIG. 18. In a number of variations, the scooter 30 may be manually propelled by a rider 44, a variation of which is illustrated in FIG. 4. In another variation, the scooter 30 may be automatically propelled by any number of motors including, but not limited to, an electric motor 46, a variation of which is illustrated in FIG. 1. The electric motor 46 may be located in any number of locations on the scooter 30 including, but not limited to, within a first wheel 50. Any number of electric motors 46 may be used including, but not limited to, a brushless hub motor. In one variation, a brushless hub motor 46 may be operatively connected to the first wheel 50 and may be powered by one or more batteries 48 which may be connected to the first fork 54, a variation of which is illustrated in FIG. 1, as will be discussed hereafter.

The figures illustrate the first wheel 50 as the front wheel for illustrative purposes only, and it is noted that the foldable scooter 50 may be constructed and arranged so that the first wheel is the rear wheel and the scooter is constructed and arranged to fold to a compact size in a similar "reversed" manner. Referring to FIGS. 1-3, 5, and 8, in a number of variations, a foldable scooter 30 may include a first fork 54.

Figure 5:
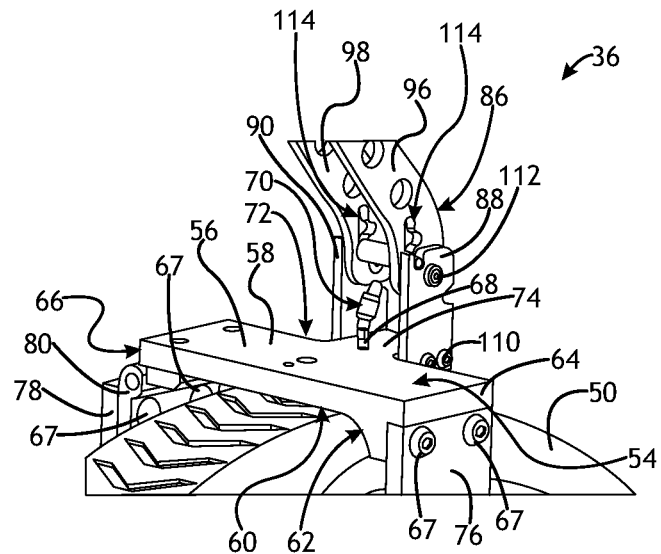
FIG. 5 illustrates a close-up view of a folding mechanism for a foldable scooter according to a number of variations.
Figure 6:
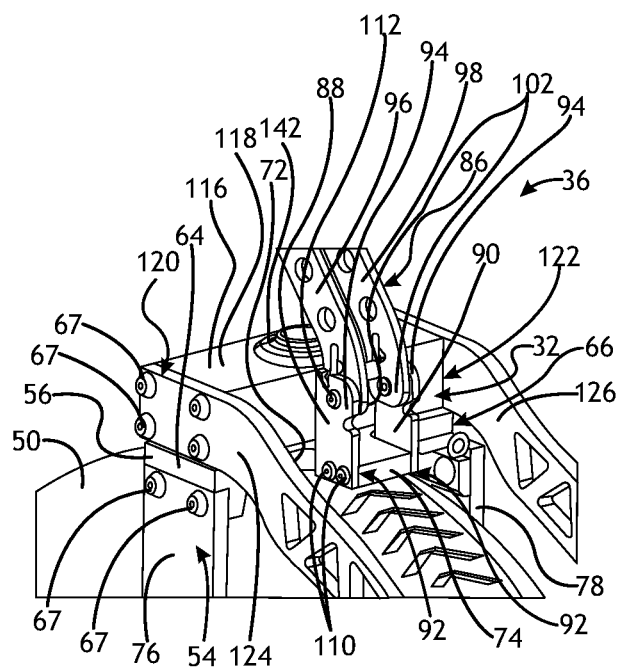
FIG. 6 illustrates a close-up view of a folding mechanism for a foldable scooter according to a number of variations.
Figure 7:
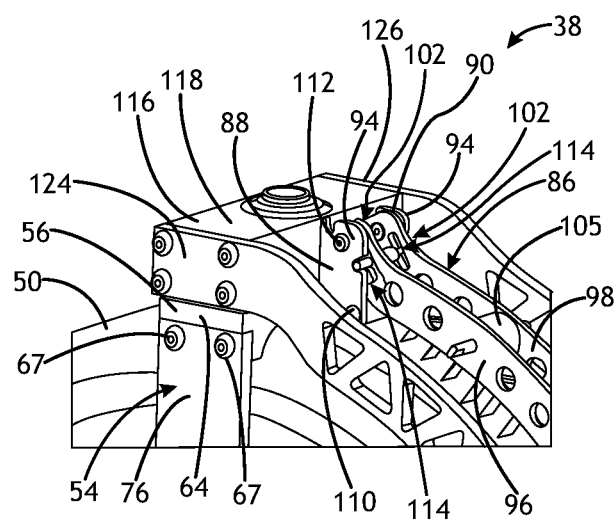
FIG. 7 illustrates a close-up view of a folding mechanism for a foldable scooter according to a number of variations.
Figure 8:
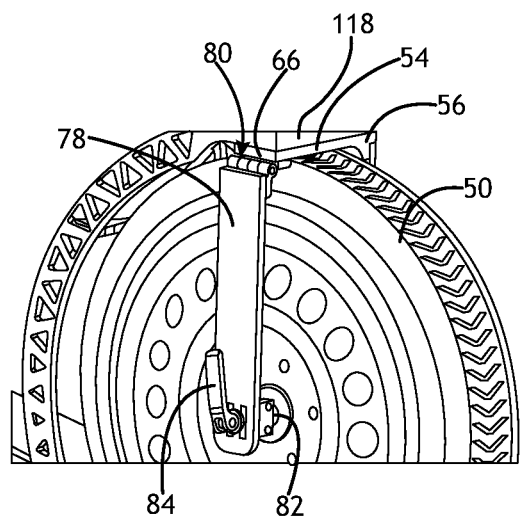
FIG. 8 illustrates a close-up view of a fork and neck area of a foldable scooter according to a number of variations.

The first fork 54 may include a base 56, a first extension 76, and a second extension 78. In a number of variations, the base 56 may be constructed and arranged to surround a portion of a first wheel 50. In a number of variations, the first wheel 50 may comprise the dimensions of a vehicle spare tire and/or may comprise a vehicle spare tire. The base 56 may include a top surface 58 and a bottom surface 60, a variation of which is illustrated in FIG. 5. The base 56 may be planar or may include one or more curved surfaces 62 which may contour the first wheel 50, a variation of which is also illustrated in FIG. 5. A first end 64 of the base 56 may be constructed and arranged to attach to the first extension 76 and a second end 66 of the base 56 may be constructed and arranged to attach to the second extension 78, variations of which are illustrated in FIGS. 5-7. The first extension 76 and the second extension 78 may extend downward along opposing sides 52 of the first wheel 50 and may be parallel to each other, variations of which are illustrated in FIGS. 1 and 2. In a number of variations, the first extension 76 and/or the second extension 78 may include a hinge feature 80, a variation of which is illustrated in FIG. 8, which may allow the first extension 76 and/or the second extension 78 to rotate from a vertical to a horizontal position. This may allow easy access to the first wheel 50 and/or the electric motor 46 (if present). The first extension 76 and the second extension 78 may be attached to the base 56 in any number of variations including, but not limited to, one or more mechanical fasteners 67, a variation of which is illustrated in FIG. 5.

Referring to FIG. 1, in a number of variations, the first or second extension 76, 78 may be constructed and arranged to accommodate one or more batteries 48 which may be used to power an electric motor 46.

Referring to FIG. 5, in a number of variations, the base 56 may also include a perpendicular extension 68 which may accommodate a hook feature 70. In a number of variations, the hook feature 70 may attach to one or more cables, as will be discussed hereafter.

Referring to FIGS. 2 and 8, in a number of variations, the first wheel 50 may be attached to the first fork 54 with a first axle 82 which may extend through the first extension 76, the first wheel 50, and the second extension 78, and may allow for rotation of the first wheel 50. In a number of variations, the first axle 82 may include one or more a locking features 84 which may be constructed and arranged so that the first extension 76 and/or the second extension 78 may be locked to the first axle 82 or unlocked from the first axle 82.

Referring to FIGS. 5 and 6, in a number of variations, the front end 72 of the base 56 may also include a front extension 74 which may extend from the front end 72 of the base 56 and may be constructed and arranged to accommodate a steerer unit 86, when the first wheel 50 may be a front wheel.

Referring to FIGS. 2 and 5-7, in a number of variations, a steerer unit 86 may be attached to the base 56 of the first fork 54. The steerer unit 86 may include a first lower member 88, a second lower member 90, a first upper member 96, and a second upper member 98. The first and second lower members 88, 90 may be planar and may comprise a length which may be longer than the neck base 118 as will be discussed hereafter. The first end 92 of the first and second lower members 88, 90 may be constructed and arranged to attach to the first fork 54, a variation of which is illustrated in FIG. 6. The first and second lower members 88, 90 may be attached to the first fork 54 in any number of variations including, but not limited to, attaching the first and second lower members 88, 90 to opposing sides of the front extension 74 of the base 56 of the first fork 54 using one or more mechanical fasteners 67 and/or welding.

In a number of variations, a second end 94 of the first lower member 88 may be constructed and arranged to rotatably attach to a first end 102 of the first upper member 96 and the second end 94 of the second lower member 90 may be constructed and arranged to rotatably attach to a first end 102 of the second upper member 98 and may comprise a folding mechanism 32, variations of which are illustrated in FIGS. 6 and 7. The first and second upper members 96, 98 may be rotatably attached to the first and second lower members 88, 90 in any number of variations including, but not limited to, one or more mechanical fasteners 112.

Referring to FIGS. 2 and 6-7, in a number of variations, the first and second upper members 96, 98 may extend parallel to each other and may be attached together using one or more mechanical fasteners 105. In a number of variations, the steerer unit 86 may include one or more locking features 114 which may be used to lock the steerer unit 86 in an upright or unfolded position 36, a variation of which is illustrated in FIG. 6, or may lock the steerer unit 86 in a folded position 38 so that the first and second upper members 96, 98 may be folded down around a portion of the first wheel 50, a variation of which is illustrated in FIG. 7. The first and second upper members 96, 98 may be constructed and arranged to include an arc or curve 100, a variation of which is illustrated in FIG. 2, which may contour the first wheel 50 in a folded position 38, as will be discussed hereafter. In another variation where the first wheel 50 is the rear wheel, the steerer unit may be operatively connected to the second tire through a second fork and may also be include one or more folding mechanisms so that the steerer unit may fold around the first wheel 50. The steerer unit may also include an arc or a curved shaped so that it may contour the first wheel 50 when in a folded position.

Referring to FIGS. 1-4, in a number of variations, a first and second handle bar 106, 108 may be attached to a second end 104 of the steerer unit 86. The first and second handle bars 106, 108 may comprise one single continuous piece, or may be separate components. The handle bars 106, 108 may be used to rotate the steerer unit 86 around a vertical axis so that the first fork 54 may rotate and may steer the foldable scooter 30 in a left or right direction. In a number of variations, the handle bars 106, 108 may also include a folding mechanism 35 which may allow the handle bars 106, 108 to fold downward toward each other, a variation of which is illustrated in FIG. 17, or rotated so that the handle bars 106, 108 may be aligned within the steerer unit 86. In a number of variations, the steerer unit 86 may comprise a length so that a rider 44 may easily hold onto the handle bars 106, 108 and steer the foldable scooter 30, a variation of which is illustrated in FIG. 4.

Referring to FIGS. 2, 6 and 7, in a number of variations, a neck 116 may be rotatably attached to the first fork 54. In one variation, the neck 116 may include a neck base 118, a first member 124, and a second member 126, variations of which are illustrated in FIGS. 6-7. In one variation, the neck base 118, first member 124, and second member 126 may be separate components and may be attached together in any number of variations including, but not limited to, one or more mechanical fasteners 67 and/or welding. In another variation, the neck base 118, first neck member 124, and second neck member 126 may be one single continuous component. In a number of variations, the first neck member 124 may extend from a first side 120 of the neck base 118 and the second neck member 126 may extend from a second side 122 of the neck base 118 opposite of the first neck member 124. The first neck member 124 and the second neck member 126 may be symmetrical to each other and may each contour the shape of a portion of the first wheel 50, a variation of which is illustrated in FIG. 2.

Referring again to FIG. 2, in a number of variations, a connector 132 may extend between the first neck member 124 and the second neck member 126 and may attach the first neck member 124 and the second neck member 126 together which may increase the strength of the neck 116. The connector 132 may be attached to the first neck member 124 and the second neck member 126 using one or more mechanical fasteners 138 and/or welding. In a number of variations, the connector 132 may also include one or more cutouts 136 which may be constructed and arranged to allow one or more cables 140 through the connector 132 as will be discussed hereafter. The neck 116 may be attached to the first fork 54 in any number of variations including, but not limited to, attaching the neck base 118 to the base 56 of the first fork 54 using one or more mechanical fasteners 142.

Referring to FIGS. 1-3, 9, 10, and 14, in a number of variations, a deck 144 may be rotatably attached to a bottom end 128 of the first neck member 124 and the second neck member 126 and may comprise a folding mechanism 34. The first neck member 124 and the second neck member 126 may be attached to the deck 144 in any number of variations including, but not limited to, one or more mechanical fasteners 152, a variation of which is illustrated in FIGS. 1-3. A second wheel 154 may be attached to a rear end 146 (or front end) of the deck 144. In a number of variations, a second axle 156 may extend through the deck 144 and the second wheel 154 so that the second wheel 154 may rotate.

In a number of variations, the deck 144 may comprise a plurality of segments 158, 174 which may be linked together. The segments 158, 174 may be linked together in any number of variations including, but not limited to, one or more mechanical fasteners 166. The segments 158, 174 may each include a top surface 160 and a first and second side surface 162, 176 variations of which are illustrated in FIGS. 9 and 10. The configuration of the segments 158, 174 may vary in length and shape. The side surfaces 162, 174 of the segments 158, 174 may be constructed and arranged to surround a portion of the side surfaces 52 of the first wheel 50. The segments 158, 174 may be constructed and arranged so that the deck 144 may be folded 38 underneath and around the first wheel 50, or may remain unfolded 36 so that the deck 144 may be flat to accommodate a rider 44 when the foldable scooter 30 may be operated, variations of which are illustrated in FIG. 14. The segments 158, 174 may be constructed and arranged so that in the unfolded position 36, the deck 144 may be self-supporting and may not fold. The deck 144 may also be constructed and arranged to include an anti-trap feature so that a foot of the rider 44 may not catch in the deck 144.

Referring to FIG. 1, in one variation, the deck 144 may comprise a plurality of first segments 158 and a plurality of second segments 174 which may alternate to form the deck 144. In one variation, the first segments 158 may include side surfaces 162 which may have an upper portion 170 that may have a width which may be less than the width of the lower portion 172 of the side surfaces 162. The second segments 174 may include side surfaces 176 which may have an upper portion 178 that may have a width which may be greater than the width of the lower portion 180. The segment 174 which may be on the end 146 (of front) of the deck 144 may also be constructed and arranged to accommodate the second wheel 154.

Referring to FIGS. 2, 3, and 9, in a number of variations, one or more cables 140 may be attached to the underside 148 of the deck 144 and may extend to the steerer unit 86. The cables 140 may be slidably attached to the underside 148 of the deck 144 in any number of variations including, but not limited to, extending the cables 140 through one or more mechanical fasteners 149 attached to the underside 148 of the deck 144, a variation of which is illustrated in FIG. 9. In one variation, the cables 140 may be attached to a hook feature 70 which may be located on the base 56 of the first fork 54 (a variation of which is illustrated in FIG. 5). In another variation, the one or more cables 140 may be attached directly to the steerer unit 86. The one or more cables 140 may also extend through the connector 132 which may be located between the first neck member 124 and the second neck member 126 which may provide alignment of the one or more cables 140, a variation of which is illustrated in FIG. 2. When the steerer unit 86 may be in an upright or an unfolded position 36, the one or more cables 140 may tighten which may lock the linked segments 158, 174 into an unfolded position 38 and may prevent the segments 158, 174 from folding. When the steerer unit 86 may be in a folded position 38, the one or more cables 140 may loosen which may release the tension in the cables 140 so that the segments 158, 174 may fold.

In a number of variations, the top surface 160 of the segments 158, 174 may include a width so that a rider 44 may stand on the deck 144 during operation of the foldable scooter 30, a variation of which is illustrated in FIG. 4. In another variation, the deck 144 may include a width so that a removable seating unit 168 may be attached to the deck 144 so that a rider 44 may sit on the seating unit 168 during operation of the foldable scooter 30, a variation of which is illustrated in FIG. 11. The seating unit 168 may be attached to the deck 144 in any number of variations including, but not limited to, one or more mechanical fasteners and/or one or more latching features. In a number of variations, the seating unit 168 may also be constructed and arranged to act as a storage compartment so that a rider 44 may store objects in the scooter 30. In another variation, the seating unit 168 may be constructed and arranged to be a cooler. In one variation, the cooler may be electrically powered.

Referring to FIGS. 7 and 14-18, in a number of variations, the foldable scooter 30 may be folded 38 to a compact size 40. In a variation where a seat unit 168 may be attached, the seat unit 168 may first be removed from the deck 144. The handle bars 106, 108 may then be folded downward within the steerer unit 168 or rotated to be aligned within the steerer unit 86. The steerer unit 86 may then be unlocked from an upright or unfolded position 36 so that it may fold over a portion of the first wheel 50 between the first and second members 124, 126 of the neck 116, a variation of which is illustrated in FIG. 7. This may release the tension on the one or more cables 140 extending from the steerer unit 86 (or first fork 54) to the deck 144, as discussed above. The deck 144 may then be folded underneath and around a portion of the first wheel 50, variations of which are illustrated in FIGS. 14 and 17. In a number of variations, the foldable scooter 30 may be constructed and arranged so that in a folded position 38 the foldable scooter 30 may be a dimension so that it may be stored in the spare tire compartment 42 of a vehicle, a variation of which is illustrated in FIG. 18. In a number of variations, the foldable scooter 30 may include one or more locking mechanisms which may lock the foldable scooter 30 in the compact position 40. In another variation, a strap (not illustrated) may be used in addition to the locking mechanisms or in place of the locking mechanisms. The strap may be used to bridge the gap between the deck 144 and the steerer unit 86 to keep the foldable scooter 30 in the compact position 40.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a scooter with an integrated folding system, wherein the scooter further comprises a first folding mechanism which allows a first and a second handle bar to fold within a steerer unit, a second folding mechanism which allows the steerer unit to be folded around a first wheel, and a third folding mechanism which allows a deck to be folded around the first wheel.

Variation 2 may include a product as set forth in Variation 1 wherein the scooter is constructed and arranged so that when it is folded to a compact size it fits within a vehicle spare tire compartment.

Variation 3 may include a product as set forth in any of Variations 1-2 wherein the scooter further includes an electric motor.

Variation 4 may include a product as set forth in any of Variations 1-3 wherein the steerer unit further comprises a first lower member, a second lower member, a first upper member, and a second upper member; wherein the first and the second lower members are attached to a fork and the first and the second upper members are rotatably attached to the first and the second lower members so that the first and the second upper members may rotate around a portion of the first wheel; and wherein the steerer unit includes at least one locking feature so that the steerer unit can lock in an upright position during operation of the scooter and can be unlocked to fold the scooter.

Variation 5 may include a product as set forth in any of Variations 1-4 wherein the deck further comprises a plurality of segments that are linked together so that the deck is flat and self-supporting in an unfolded position and contours the first wheel in a folded position.

Variation 6 may include a product as set forth in any of Variations 1-5 further comprising at least one cable attached to an underside of the deck and the steerer unit, wherein the at least one cable is constructed and arranged so that when the steerer unit is in an unfolded position the at least one cable tightens and prevents the deck from folding and when the steerer unit is in a folded position the at least one cable loosens and allows the deck to fold.

Variation 7 may include a product as set forth in any of Variations 1-6 wherein the plurality of segments are constructed and arranged to comprise an anti-trap feature.

Variation 8 may include a product as set forth in any of Variations 1-7 wherein the scooter further comprises a seating unit removably attached to the deck.

Variation 9 may include a product as set forth in Variation 8 wherein the seating unit further comprises at least one of a storage box or a cooler.

Variation 10 may include a product as set forth in any of Variations 1-9 wherein the scooter further comprises a first fork operatively attached to the first wheel, wherein the first fork includes a base, a first extension which extends from a first end of the base, and a second extension which extends from a second end of the base, and wherein at least one of the first extension or the second extension includes a hinge feature to allow access to at least one of the first wheel or a motor.

Variation 11 may include a product as set forth in Variation 10 wherein at least one of the first extension or the second extension is constructed and arranged to accommodate one or more batteries for the motor.

Variation 12 may include a scooter comprising: a first wheel; a first fork, wherein the first wheel is rotatably attached to the first fork; a neck, wherein the neck is rotatably attached to the first fork and contours a portion of the first wheel; a deck, wherein the deck is rotatably attached to the neck; a second wheel, wherein the second wheel is operatively connected to the deck; and a steerer unit, wherein the steerer unit further comprises a first handle bar and a second handle bar rotatably attached to the steerer unit, and wherein the steerer unit is operatively attached to the first wheel or the second wheel; wherein the steerer unit is constructed and arranged so that it can fold around the first wheel and the deck is constructed and arranged so that it can fold around the first wheel.

Variation 13 may include a product as set forth in Variation 12 wherein the steerer unit includes at least one locking mechanism, wherein when the locking mechanism is in a locked position, the steerer unit remains in an upright unfolded position and when the at least one locking mechanism is unlocked, the steerer unit can be folded around the first wheel.

Variation 14 may include a product as set forth in any of Variations 12-13 further comprising at least one cable which extends along an underside of the deck and around the steerer unit, wherein a first end of the at least one cable is attached to a rear end or front end of the underside of the deck and a second end of the at least one cable is attached to at least one of the steerer unit or the first fork, and wherein when the steerer unit is in an unfolded position the at least one cable tightens so that the deck is locked in a flat unfolded position and when the steerer unit is folded, the at least one cable loosens so that the deck can fold.

Variation 15 may include a product as set forth in any of Variations 12-14 wherein the first fork further includes at least one hinge feature which allows access to at least one of the first wheel or a motor.

Variation 16 may include a product as set forth in any of Variations 12-15 wherein the scooter further comprises an electric motor.

Variation 17 may include a product as set forth in any of Variations 12-16 wherein the first fork is constructed and arranged to accommodate at least one battery.

Variation 18 may include a method comprising folding a scooter comprising: integrating a scooter with a first folding mechanism, a second folding mechanism, and a third folding mechanism; activating the first folding mechanism to fold a first and a second handle bar within a steerer unit; activating the second folding mechanism to fold the steerer unit around a portion of a first wheel; and activating the third folding mechanism to fold a deck around a portion of the first wheel.

Variation 19 may include a method as set forth in Variation 18 wherein the scooter is constructed and arranged to fit in a spare tire storage compartment when the first folding mechanism, the second folding mechanism, and the third folding mechanism are activated.

Variation 20 may include a method as set forth in any of Variations 18-19 wherein the scooter is an electrically propelled scooter.

The above description of select variations within the scope of the invention is merely illustrative in nature and, thus, variations or variants thereof are not to be regarded as a departure from the spirit and scope of the invention.

What is claimed is:

1. A product comprising:
a scooter with an integrated folding system, wherein the scooter further comprises a first folding mechanism which allows a first and a second handle bar to fold within a steerer unit, a second folding mechanism which allows the steerer unit to be folded around a first wheel, and a third folding mechanism which allows a deck to be folded underneath and around the first wheel.

2. The product of claim 1 wherein the scooter is constructed and arranged so that when it is folded to a compact size it fits within a vehicle spare tire compartment.

3. The product of claim 1 wherein the scooter further includes an electric motor.

4. The product of claim 1 wherein the steerer unit further comprises a first lower member, a second lower member, a first upper member, and a second upper member; wherein the first and the second lower members are attached to a fork and the first and the second upper members are rotatably attached to the first and the second lower members so that the first and the second upper members may rotate around a portion of the first wheel; and wherein the steerer unit includes at least one locking feature so that the steerer unit can lock in an upright position during operation of the scooter and can be unlocked to fold the scooter.

5. The product of claim 1 wherein the deck further comprises a plurality of segments that are linked together so that the deck is flat and self-supporting in an unfolded position and contours the first wheel in a folded position.

6. The product of claim 5 further comprising at least one cable extending from an underside of the deck to the steerer unit, wherein the at least one cable is constructed and arranged so that when the steerer unit is in an unfolded position the at least one cable tightens and prevents the deck from folding and when the steerer unit is in a folded position the at least one cable loosens and allows the deck to fold.

7. The product of claim 5 wherein the plurality of segments are constructed and arranged to comprise an anti-trap feature.

8. The product of claim 1 wherein the scooter further comprises a seating unit removably attached to the deck.

9. The product of claim 8 wherein the seating unit further comprises at least one of a storage box or a cooler.

10. The product of claim 1 wherein the scooter further comprises a first fork operatively attached to the first wheel, wherein the first fork includes a base, a first extension which extends from a first end of the base, and a second extension which extends from a second end of the base, and wherein at least one of the first extension or the second extension includes a hinge feature to allow access to at least one of the first wheel or a motor.

11. The product of claim 10 wherein at least one of the first extension or the second extension is constructed and arranged to accommodate one or more batteries for the motor.

12. A scooter comprising:
a first wheel;
a first fork, wherein the first wheel is rotatably attached to the first fork;
a neck, wherein the neck is rotatably attached to the first fork and contours a portion of the first wheel;
a deck, wherein the deck is rotatably attached to the neck;
a second wheel, wherein the second wheel is operatively connected to the deck; and
a steerer unit, wherein the steerer unit further comprises a first handle bar and a second handle bar rotatably attached to the steerer unit, and wherein the steerer unit is operatively attached to the first wheel or the second wheel;
wherein the steerer unit is constructed and arranged so that it can fold around the first wheel and the deck is constructed and arranged so that it can fold around the first wheel.

13. The product of claim 12 wherein the steerer unit includes at least one locking mechanism, wherein when the locking mechanism is in a locked position, the steerer unit remains in an upright unfolded position and when the at least one locking mechanism is unlocked, the steerer unit can be folded around the first wheel.

14. The product of claim 12 further comprising at least one cable which extends along an underside of the deck and around the steerer unit, wherein a first end of the at least one cable is attached to a rear end or front end of the underside of the deck and a second end of the at least one cable is attached to at least one of the steerer unit or the first fork, and wherein when the steerer unit is in an unfolded position the at least one cable tightens so that the deck is locked in a flat unfolded position and when the steerer unit is folded, the at least one cable loosens so that the deck can fold.

15. The product of claim 12 wherein the first fork further includes at least one hinge feature which allows access to at least one of the first wheel or a motor.

16. The product of claim 12 wherein the scooter further comprises an electric motor.

17. The product of claim 16 wherein the first fork is constructed and arranged to accommodate at least one battery.

18. A method comprising folding a scooter comprising:
integrating a scooter with a first folding mechanism, a second folding mechanism, and a third folding mechanism;
activating the first folding mechanism to fold a first and a second handle bar within a steerer unit;
activating the second folding mechanism to fold the steerer unit around a portion of a first wheel; and
activating the third folding mechanism to fold a deck around a portion of the first wheel.

19. The method of claim 18 wherein the scooter is constructed and arranged to fit in a spare tire storage compartment when the first folding mechanism, the second folding mechanism, and the third folding mechanism are activated.

20. The method of claim 18 wherein the scooter is an electrically propelled scooter.

* * * * *